United States Patent [19]

Mampaey et al.

[11] Patent Number: 5,781,285
[45] Date of Patent: Jul. 14, 1998

[54] METHOD AND APPARATUS FOR MONITORING PRESENCE AND DIRECTION OF LIGHT IN OPTICAL FIBERS

[75] Inventors: Paul Mampaey, Tremelo; Mark DeMuyter, Aalst, both of Belgium

[73] Assignee: NuVisions International, Inc., Shohola, Pa.

[21] Appl. No.: 771,968

[22] Filed: Dec. 23, 1996

[51] Int. Cl.$^6$ ............................................. G01N 21/84
[52] U.S. Cl. .................................................. 356/73.1
[58] Field of Search .................................... 356/73.1

[56] References Cited

U.S. PATENT DOCUMENTS 5,067,786  11/1991  Hawkins et al. ............... 356/73.1 X
5,357,332  10/1994  Chappel ............................ 356/73.1

*Primary Examiner*—Vincent P. McGraw

*Attorney, Agent, or Firm*—Charles S. McGuire; George R. McGuire

[57] ABSTRACT

Apparatus and method of determining presence or absence of light activity in an optical fiber without separation or disconnection thereof from other fibers or from apparatus to which the fiber is connected, and without interruption of transmission. The method involves contacting the fiber with a probe and moving it laterally to produce a macro-bend at which a portion of light traveling through the fiber, if any, escapes from the fiber. The escaping light is reflected from a concave surface in a fixture through which the fiber passes and is detected by a photocell in the probe which contacts and moves the fiber. The probe is engageable with the fixture in either of two rotational orientations to receive light reflected from two different areas of the reflecting surface, thereby indicating the direction of light travel. Initial calibration and positional adjustment of the probe relative to the fixture also permits determination of light intensity.

21 Claims, 3 Drawing Sheets

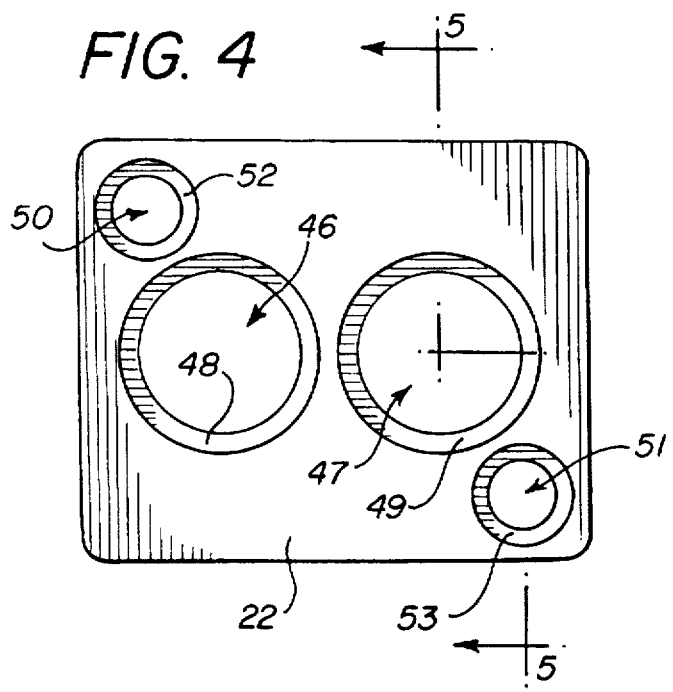
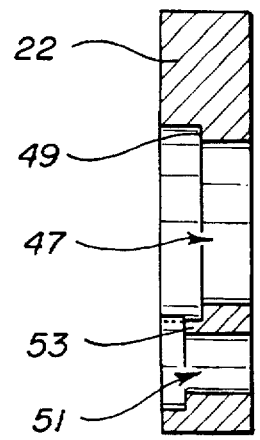
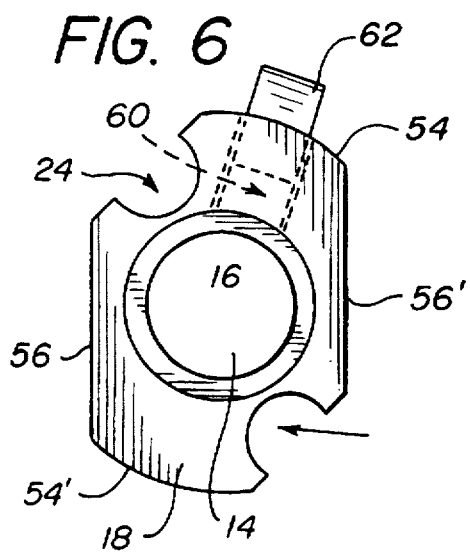
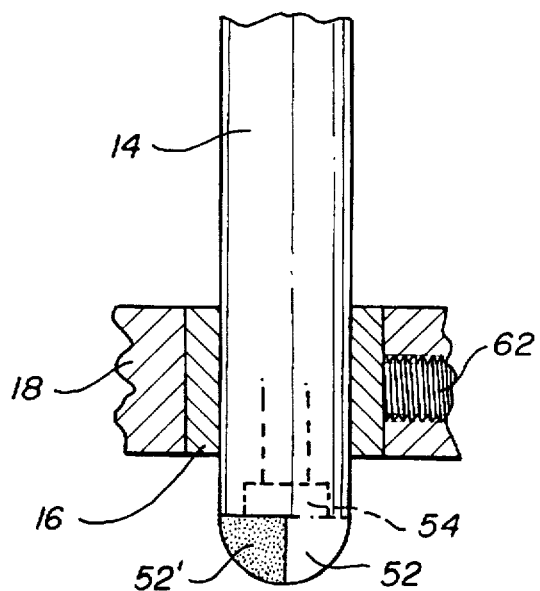

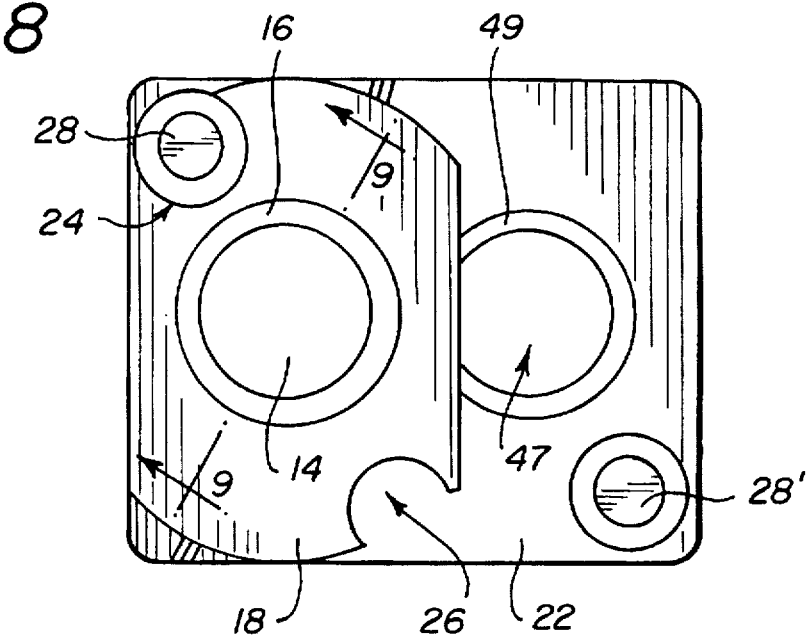
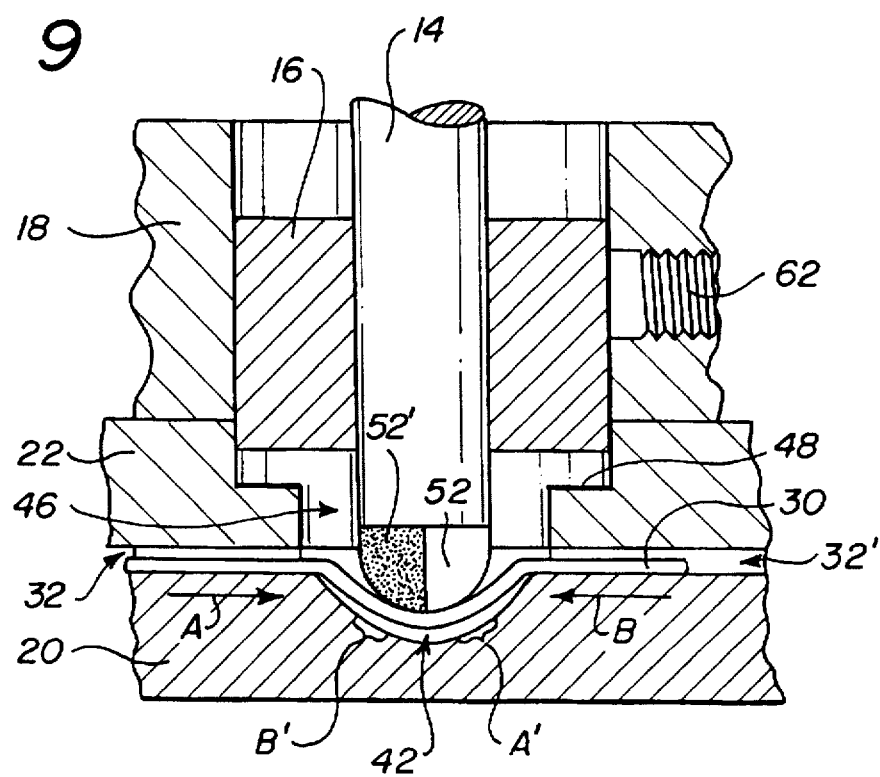

METHOD AND APPARATUS FOR MONITORING PRESENCE AND DIRECTION OF LIGHT IN OPTICAL FIBERS

TECHNICAL FIELD

The present invention relates to fiber optic testing or monitoring equipment and procedures. More specifically, the invention relates to novel and improved methods and apparatus for determining presence or absence of optical wave activity (hereinafter referred to for convenience simply as "light") in a particular optical fiber and, when light is present, for determining its direction and magnitude.

BACKGROUND ART

It is often necessary, in the course of operation of fiber optic equipment, to determine whether or not light is being transmitted at a given time through a particular portion of an optical fiber. It is often also useful to know the direction of the light through the fiber and, in some cases, the level of light intensity. The fiber under test is commonly one of several forming a fiber cable or bundle which passes through a splice tray, or the light.

Various devices in the nature of light-sensing probes are presently available for performing such monitoring. These probes operate by sensing light lost, i.e., light transmitted through the fiber wall, at a macro bend in the fiber within the probe. This requires that the fiber be disconnected or unwrapped from within the splice tray for insertion in the probe. In addition to the tedious and time consuming nature of this procedure, the fiber sometimes is not long enough to permit insertion in the probe in the proper manner. Furthermore, fibers are subject to breakage or other damage during the course of the testing.

OBJECTS OF THE INVENTION

It is a principal object of the present invention to provide more simple and economical, yet highly reliable means for testing light activity in optical fibers.

Another object is to provide a method of testing or monitoring the presence and direction of light activity in an optical fiber without unwrapping or removing the fiber from a splice tray, or the like, and without interruption of transmission.

A further object is to provide a novel and improved fixture and structurally compatible probe for effecting macro-bend light monitoring procedures of optical fibers.

Still another object is to provide apparatus incorporated directly into a fiber optic splice tray, or the like, to permit quick and simple testing of individual fibers for light activity.

Other object will in part be obvious and will in part appear hereinafter.

SUMMARY OF INVENTION

The apparatus used to monitor light activity includes a fixture and a hand-held probe. The fixture may be permanently mounted in a splice tray or other conventional piece of fiber optic equipment through which the fiber to be tested passes. The fixture includes a highly polished, concave surface of predetermined curvature. The fiber to be tested passes over this surface and, when testing is performed, is contacted and moved toward the concave surface by a distal end of the probe. The fixture and probe also include cooperative engagement means to ensure proper alignment of the probe with the concave surface.

Movement of the fiber by the probe produces a macro bend in the fiber, causing a portion of the light traveling through the fiber, if any, to pass through the fiber wall. This light is redirected by the polished fixture surface to a photocell within the probe. An indicator on the probe, or on a separate device to which it is connected, indicates presence or absence of light activity in response to detection of light by the photocell. Selective masking of a lens forming the distal end of the probe provides a method to determined the direction of light traveling through the fiber when the probe is inserted in the fixture. The area of light leakage from the fiber will appear in one of two positions on the reflective surface, depending upon the direction of light travel, and masking of portions of the lens permits detection of the position of the area of leakage.

In the preferred embodiment, the fixture includes a top plate and a bottom plate. The bottom plate includes one or more of the polished, concave areas, of stainless steel or other highly reflective material, of predetermined diameter and radius of curvature. Grooves extend across the surface of the plate from opposite sides of the concave areas to the edges of the bottom plate. The fiber to be monitored passes through these grooves, thus passing diametrically across the concave area, and is retained therein by the top plate upon installation thereof in covering relation to the bottom plate.

A pair of dowel pins in the bottom plate extend into locating holes in the top plate to ensure proper alignment. The top plate includes a through opening of diameter substantially equal to that of the concave area in the bottom plate and positioned in alignment therewith. A counterbore on the upper side of the top plate provides a stepped shoulder surrounding the through opening. The probe is cylindrical in shape, having a lens positioned at its distal end. A surrounding collar provides a stepped surface on the probe spaced a predetermined axial distance from the end of the lens.

The probe and collar are dimensioned cooperatively with the top and bottom plates of the fixture to permit controlled insertion of the probe into the top plate opening in predetermined orientation to the concave area in the bottom plate. An opening or groove in or near the periphery of the collar engages one of the dowel pins to establish proper rotational orientation of the probe relative to the concave area and position of the fiber. The convex curvature of the lens is related to the curvature of the concave area of the bottom plate so as to produce a controlled macro bend in the fiber as the probe is inserted and the fiber engaged by the end of the lens. The distance of insertion of the probe is limited by contact of the collar with the top plate and the releasably fixed axial position of the probe relative to the collar. This prevents damage to the fiber or improper readings which could result from excess pressure being applied to the probe. The probe is axially aligned and positionally stabilized by a bushing on the probe entering the counterbore in the top plate.

The controlled macro bend results in a small amount of light loss through the fiber wall. The light which escapes from the fiber is reflected by a first portion of the concave surface of the bottom plate when light is traveling through the fiber in a first direction. When light is traveling in the opposite direction, the escaping light is reflected by a second portion of the concave surface. The lens is masked to permit reception of light reflected from the first portion when the probe is in a first rotational orientation, and from the second portion when the probe is in a second rotational orientation. As previously mentioned, the rotational orientation is controlled by mating engagement of portions of the probe collar with the locating pins on the fixture. Thus, orientation of the probe when light is detected provides an indication of light direction in the fiber.

The foregoing and other features of construction and operation of the invention will be more readily understood and fully appreciated from the following detailed description, with reference to the accompanying drawings.

BRIEF DESCRIPTION OF THE DRAWINGS

FIG. 4 is a top plan view of the top plate of the fixture portion;

FIG. 5 is an elevational view in section on the line 5—5 of FIG. 4;

FIG. 6 is a top plan view of the probe portion of the apparatus;

FIG. 7 is a fragmentary, elevational view in section on the line 7—7 of FIG. 6;

FIG. 8 is a top plan view of the probe portion engaged in operative relation with the fixture portion; and FIG. 9 is an elevational view in section on the line 9—9 of FIG. 8.

DETAILED DESCRIPTION

Figure 1:
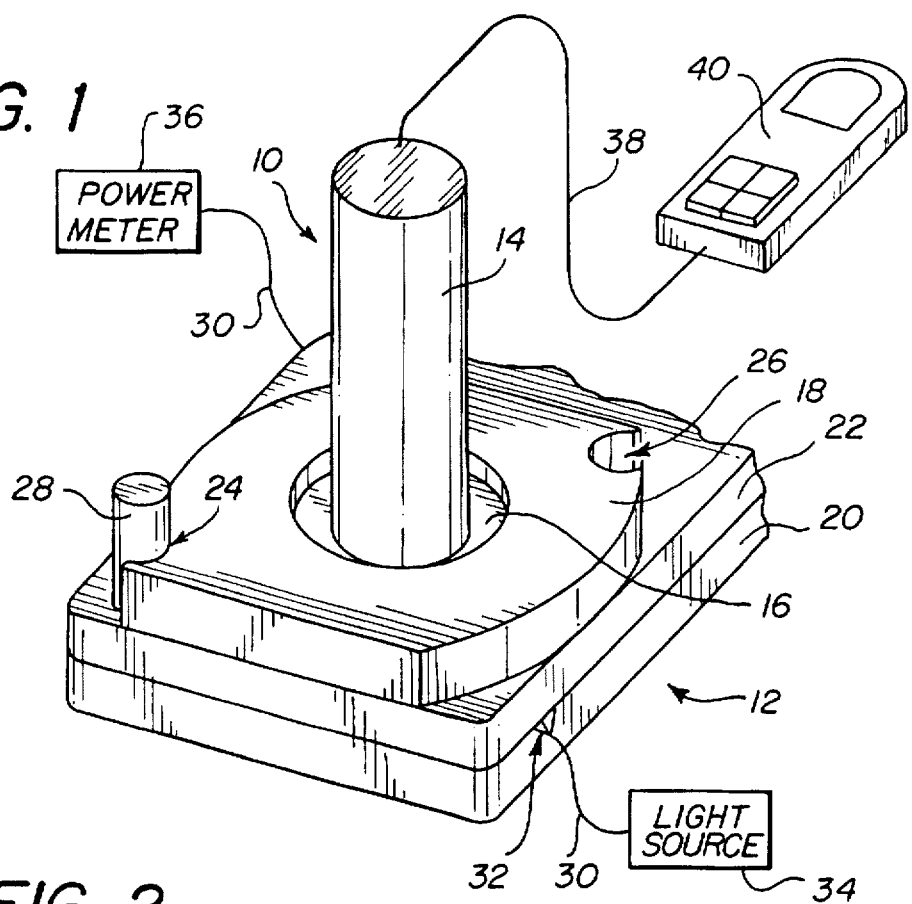
FIG. 1 is a fragmentary, perspective view of the apparatus of the invention.

Referring now to the drawings, the apparatus of the invention is seen in FIG. 1 to include a probe portion and a fixture portion, respectively denoted generally by reference numerals 10 and 12. Probe portion 10 includes an elongated shaft containing a photocell with suitable electrical connections and referred to herein as probe 14, bushing 16 and collar 18. Fixture portion 12 includes superposed bottom and top plates 20 and 22, respectively. Probe portion 10 may be operatively engaged with fixture portion 12 to perform monitoring or measuring procedures, as described later herein, in either of two, 180° opposite orientations of rotation about the longitudinal axis of probe 14, as determined by which of notches or grooves 24 and 26 in the periphery of collar 18 is in partially encircling relation to cylindrical pin 28.

Optical fiber 30 extends through a V-shaped groove 32 in bottom plate 20, one end of which is seen in FIG. 1, being captured in the groove by superposed top plate 22. Fiber 30 is shown in FIG. 1 connected to light source 34 on one side of fixture portion 12 and to power meter 36 on the opposite side, providing means for effecting calibration in a manner described later. The light-detecting means (photocell) within probe 14 is connected by electrical line 38 to hand-held meter 40. It is preferred that fixture portion 12 be fixedly mounted in a conventional apparatus through which the fiber to be tested passes, such as a splice tray.

Figure 2:
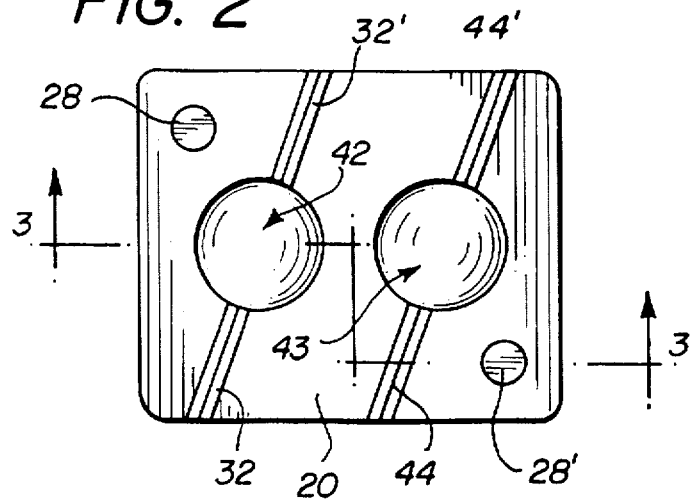
FIG. 2 is a top plan view of the bottom plate of the fixture portion of the apparatus.
Figure 3:
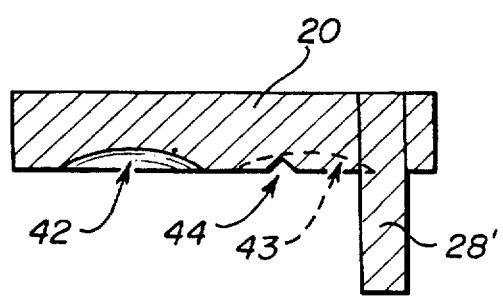
FIG. 3 is an elevational view in section on the line 3—3 of FIG. 2.

Details of bottom plate 20 are shown in FIGS. 2 and 3. A pair of identical, side-by-side, concave areas 42, 43 are formed in one side of plate 2. Grooves 32 and 32' extend from diametrically opposite sides of concave area 42 along a first, linear axis to opposite edges of bottom plate 20. Likewise, grooves 44 and 44' extend from opposite sides of area 43 along a second, linear axis to opposite edges of plate 20. Grooves 32, 32', 44 and 44' are preferably of V-shaped cross section, large enough that the fiber to be monitored may be loosely positioned in the groove, below the plane of the surface in which the grooves and concave area are formed. While at least one concave area and set of grooves are provided in each bottom plate, the total number is optional. In any case, the surfaces of all concave areas are highly polished and reflective. Dowel pins 28, 28' are threadedly engaged with tapped openings near opposite corners of bottom plate 20, and extend outwardly from the same surface in which areas 42 and 43 and grooves 32, 32', 44, and 44' are formed.

Referring now to FIGS. 4 and 5, top plate 22 includes openings 46, 47, having center-to-center spacing equal to that of concave areas 42, 43. Both of openings 46, 47 are counterbored from what is termed the upper surface to provide stepped shoulders 48, 49 surrounding openings 46, 47, respectively. A second pair of through openings 50, 51, counterbored to provide stepped shoulders 52, 53, are formed in top plate 22 with the same diameters and spacing as dowel pins 28, 28'. Fixture portion 12 is assembled by superposing top plate 22 with bottom plate 20, proper alignment being provided by dowel pins 28, 28' extending through openings 50 and 51, respectively. Prior to placing the top plate on the bottom plate, fiber 30 is placed in grooves 32, 32', thus extending across concave area 42, and a second fiber is placed in grooves 44, 44' to extend across area 43. Although the fibers are retained in the respective grooves when the lower surface of top plate 22 contacts the upper surface of bottom plate 20, the fibers are of considerably smaller cross section than the grooves and are freely movable longitudinally therein.

Probe portion 10 is shown in more detail in FIGS. 6 and 7. Probe 12 is fitted on one end with a lens, one half of which is masked to prevent entry of light; the open and masked portions of the lens are denoted by reference numerals 52 and 52', respectively. Light entering the lens through open portion 52 impinges upon photocell 53, generating an electrical signal having a magnitude proportional to the intensity of the light received. The cylindrical body of probe 14 is surrounded by annular bushing 16 which in turn is surrounded by the wall of an opening in collar 18.

The outer periphery of collar 18 is of irregular shape, including curved portions 54, 54', which are symmetrical with the center of the collar opening, and flat portions 56, 56'. Semi-cylindrical grooves or notches 24 and 26 extend into the periphery of collar 28 on diametrically opposite sides thereof; the diameters and center-to-center spacing of notches 24 and 26 are substantially equal to those of dowel pins 28, 28'. Tapped opening 60 extends radially through collar 18 to accept set screw 62 which may be advanced to engage bushing 16 and releasably fix both the axial and rotational positions of the bushing, and probe 14 to which it is permanently affixed, relative to collar 18. The fit between bushing 16 and the opening in collar 18 is close, but permits relative axial and rotational movement when set screw 62 is not engaged.

FIGS. 8 and 9 illustrate the operative association of the probe and fixture portions. Initial calibration is performed by attaching a fiber which extends through the V-grooves of a fixture to a light source and a power meter on opposite sides of the fixture. As seen in FIG. 1, for example, fiber 30 extends through grooves 32 and 32', being connected to light source 34 on one side and power meter 36 on the other side of fixture portion 12. With set screw 62 disengaged from bushing 16, as seen in FIG. 7, the end of probe 14 carrying the lens is inserted through opening 46 of top plate 22. Collar 18 is rotationally positioned to align notch 24 with dowel pin 28 to permit the lower surface of collar 18 to seat against the upper surface of top plate 22.

With light source 34 emitting light through fiber 30 in the direction of arrow A, and meter 36 providing an indication of the intensity of such light, probe 14 and bushing 16 are axially advanced with respect to collar 18 so that bushing 16 enters the counterbored portion of opening 46, as seen in FIG. 9. During such movement, the end of the lens contacts fiber 30, moving it into concave area 42 and creating a macro bend, causing light to pass through the fiber wall. When light is traveling in the direction of arrow A, as during the calibration procedure, the lost light impinges generally upon the area indicated at $A^1$ on the reflective surface of the concave area.

Probe 14 and bushing 16 are rotationally oriented with respect to collar 18 so that open or unmasked side 52 of the lens faces toward area A', whereby the reflected light impinges upon photocell 54, producing a reading on meter 40. The amount of attenuation, i.e., the amount of light lost from the fiber, is preferably near the minimum required to produce meaningful measurements, e.g., between 1 and 3 db, preferably about 2 db. The axial position of probe 14 and bushing 16 is manually adjusted while observing the readings on meters 36 and 40. When a reading of the desired value, or within the desired range, is obtained on meter 40, probe portion 10 is removed from fixture portion 12 and set screw 62 is tightened. The close fit of bushing 16 in the opening on collar 18 serves to frictionally maintain the parts in the proper relationship until the set screw is tightened.

The reading on meter 40, which is commensurate with the light reflected to impinge upon photocell 54 and the resulting electrical signal generated thereby, (preferably in the range of 1-3 db) is noted when the relative positions of the probe and collar are fixed by the set screw. The intensity of light generated by light source 34 and entering fiber 30 is known, and is compared with the reading on meter 36 to provide an indication of the total amount of light lost when the probe lens is in engagement with the fiber. That is, light will be lost at the macro bend in addition to that reflected to photocell 53, and the total attenuation may be calculated by subtracting the intensity of light received at meter 36 from that generated by light source 34. Thus, a direct relationship may be established between the reading on meter 40 and the intensity of light carried by fiber 30.

It will be understood that the arrangement shown in FIG. 1, i.e., the connection of fiber 30 to light source 34 and power meter 36, is used only during the calibration procedure. Probe portion 10 is then ready for use with any fixture portion of the same dimensions as that used in the calibration procedure. It is anticipated that a plurality of fixture portions 12 will be fixedly mounted in conventional fiber optic equipment, such as a splice tray, with one of the fibers to be monitored passing through the V-grooves and over the concave area of a corresponding fixture portion.

A single, calibrated probe portion 10, with meter 40 attached, may then be sequentially placed in operative association with identical fixture portions, thereby producing a macro bend in the fibers passing therethrough. The probe portion is initially placed in one of the two possible rotational orientations with respect to the collar. A reading on meter 40 shows the presence and direction of light activity in the fiber. If no response is shown on meter 40, the probe portion is removed, its orientation is reversed, i.e., the probe portion is rotated 180°, and it is again placed on the fixture portion. In this position, a reading on meter 40 indicates the presence of light traveling in the direction of arrow B and reflected by area B'. Furthermore, the value of the reading on meter 40 provides an indication of the intensity of light carried by the fiber, by extrapolation from the values obtained during the calibration procedure.

It is again emphasized that the monitoring procedures of the invention are carried out without interruption of normal light transmission by the fibers. There is no need to unwrap, disconnect or isolate individual fibers once they have been installed to pass through their respective fixtures. Monitoring of light activity is performed in a fraction of the time required by prior art procedures. Once a probe portion has been adjusted for operation with a particular fixture, it may be used to monitor fibers in an unlimited number of identical fixtures. Dimensions of certain portions of the fixture, e.g., the degree of curvature and diameter of the concave area, will be influenced by the diameter of the fiber with which it will be used. Reliable and repeatable reading are obtained since the mechanical fit of the probe and fixture portions ensure that the macro bend will be of identical configuration, and the lens will always be in the same, predetermined relation to the fiber and the concave area of the fixture each time the procedure is repeated.

What is claimed is:

1. The method of determining the presence or absence and direction of light traveling through an optical fiber, said method comprising:

a) forming a macro bend in said fiber to cause a portion of the light carried by said fiber, if any to pass out of the fiber to impinge upon first and second, spaced, surface areas when said light is traveling in first and second directions, respectively, wherein said surface areas are mutually distinct portions of a continuous, concave surface and said macro bend extends toward said surface;

b) reflecting light impinging upon said first and second surface areas along first and second paths, respectively;

c) positioning light-sensitive means in said first path to provide an indication of whether or not light is traveling through said fiber in said first direction, and, if not;

d) positioning light-sensitive means in said second path to provide an indication of whether or not light is traveling through said fiber in said second direction.

2. The method of claim 1 wherein the same light-sensitive means is positioned sequentially in said first and second paths.

3. The method of claim 1 wherein said light-sensitive means is a photocell, and said indication is provided by an electrical signal responsive to light impinging upon said photocell.

4. The method of claim 3 wherein said electrical signal has a value commensurate with the intensity of light impinging on said photocell, and including the further step of determining the relationship between the intensity of light traveling through said fiber and the intensity of light impinging on said photocell, thereby establishing a known relationship between the value of said electrical signal and the intensity of light traveling through said fiber.

5. The method of determining presence or absence of light activity in an optical fiber comprising:

a) passing a longitudinal portion of said fiber to extend along a predetermined path through a linear passageway in a fixture without loss of light, if any, carried by said fiber;

b) moving a device to contact and move said portion of said fiber laterally away from said path to form therein a macro bend, causing a portion of light, if any, carried by said fiber to pass out of the fiber, said device being physically separate from said fixture;

c) detecting whether or not light passes out of said fiber;

d) removing said device from contact with said fiber; and e) repositioning said portion of said fiber in said predetermined path.

6. The method of claim 5 and further including positioning a reflecting surface laterally adjacent said portion of said fiber, and wherein said portion of said fiber is moved from said predetermined path toward said reflecting surface and said portion of light impinges upon and is reflected by said reflecting surface.

7. The method of claim 6 wherein said portion of light impinges upon first and second, mutually distinct portions of said reflecting surface when light is traveling through said fiber in first and second directions, respectively, and light is reflected by said first and second portions along first and second paths, respectively.

8. The method of claim 7 wherein said detecting step is performed by positioning a photocell to receive light traveling along said first path and, if no light is detected, repositioning said photocell to receive light traveling along said second path.

9. The method of claim 5 wherein said detecting step is performed by a photocell which is a part of said device.

10. Apparatus for determining presence or absence of light activity in an optical fiber comprising:
    a) a fixture portion including a light-reflecting surface;
    b) a probe portion having a housing and a distal end which engages said fiber to form therein a macro bend at which a portion of any light carried by said fiber passes out of said fiber and is reflected by said reflecting surface to a predetermined position; and
    c) a photocell contained in said housing for providing a perceptible indication of the presence of light reflected from said reflecting surface to said predetermined position.

11. The apparatus of claim 10 wherein said probe portion includes a transparent portion at said distal end through which light reflected by said reflecting surface is directed onto said photocell.

12. The apparatus of claim 10 and further comprising means electrically connected to said photocell and having a visual display responsive to an electrical parameter of said photocell which varies commensurately with light incident thereon.

13. The apparatus of claim 10 herein said fixture portion includes a passageway through which said fiber extends.

14. Apparatus for determining presence or absence of light activity in an optical fiber comprising:
    a) a fixture portion including a passageway through which said fiber extends and a light-reflecting surface, said passageway including first and second portions extending from opposite sides of said reflecting surface, whereby said fiber extends laterally across said reflecting surface;
    b) a probe portion having a distal end which engages said fiber to form therein a macro bend at which a portion of any light carried by said fiber passes out of said fiber and is reflected by said reflecting surface to a predetermined position; and
    c) means for providing a perceptible indication of the presence of light reflected from said reflecting surface to said predetermined position.

15. The apparatus of claim 14 wherein said reflecting surface is concave and said macro bend extends toward said reflecting surface.

16. The apparatus of claim 14 wherein said fixture and probe portions include mutual engagement means defining the position of said distal end and the portion of said fiber engaged thereby relative to said reflecting surface.

17. Apparatus for determining presence or absence of light activity in an optical fiber comprising:
    a) a fixture portion including a light-reflecting surface;
    b) a probe portion having a distal end which engages said fiber to form therein a macro bend at which a portion of any light carried by said fiber passes out of said fiber and is reflected by said reflecting surface to a predetermined position;
    c) mutual engagement means for defining the positions of said distal end and the portion of said fiber engaged thereby relative to said reflecting surface, whereby a portion of light traveling in one direction passes out of said fiber to impinge upon a first area of said reflecting surface, and a portion of light traveling in the opposite direction passes out of said fiber to impinge upon a second area of said reflecting surface;
    d) means for providing a perceptible indication of the presence of light reflected from said reflecting surface to said predetermined position; and
    e) means for discriminating between which of said first and second areas receive light from said fiber.

18. The apparatus of claim 17 wherein said discriminating means comprises means permitting reception of light at said predetermined position only from said first portion of said reflecting surface when said probe portion is in a first orientation relative to said reflecting surface, and only from said second portion of said reflecting surface when said probe portion is in a second orientation relative to said reflecting surface.

19. The apparatus of claim 18 wherein said first and second orientations comprise two distinct rotational positions of said distal end and with respect to an axis intersecting said reflecting surface.

20. The apparatus of claim 19 wherein said reflecting surface is concave and said axis perpendicularly intersects the center thereof and further intersects said distal end.

21. The apparatus of claim 20 wherein said first and second portions comprise mutually distinct areas of said concave surface.

* * * * *